US006547479B2

(12) United States Patent
Dowling, Jr. et al.

(10) Patent No.: US 6,547,479 B2
(45) Date of Patent: Apr. 15, 2003

(54) SPLINE, AN ASSEMBLY UTILIZING THE SPLINE, AND A METHOD FOR TRANSFERRING ENERGY

(75) Inventors: William Edmunds Dowling, Jr., Saline, MI (US); David Joe Sell, Ypsilanti, MI (US); Perry Edward Phelan, Harsens Island, MI (US); Kin Sang Yeung, Plymouth, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/783,063

(22) Filed: Feb. 14, 2001

(65) Prior Publication Data

US 2002/0110415 A1 Aug. 15, 2002

(51) Int. Cl.$^7$ ................................. F16D 3/18
(52) U.S. Cl. ................ 403/359.2; 403/359.1; 464/158
(58) Field of Search .......... 403/359.1, 359.2, 403/359.3, 359.4, 359.5, 359.6, 298; 464/158, 182

(56) References Cited

U.S. PATENT DOCUMENTS

| 2,089,168 A | * | 8/1937 | Brown | ......................... 403/259 |
| 2,297,390 A | | 9/1942 | Burger | |
| 3,360,961 A | | 1/1968 | Steiner | |
| 3,574,366 A | * | 4/1971 | Thostenson | ................... 287/53 |
| 3,722,929 A | * | 3/1973 | Gilman | ......................... 287/53 |
| 4,115,022 A | | 9/1978 | Orain | |
| 4,368,786 A | | 1/1983 | Cousins | |
| 4,702,636 A | * | 10/1987 | Guile | .......................... 403/24 |

FOREIGN PATENT DOCUMENTS

DE         2721571      * 11/1977     .............. 403/359.6

* cited by examiner

Primary Examiner—Lynne H. Browne
Assistant Examiner—Michael P. Ferguson
(74) Attorney, Agent, or Firm—Frank G. McKenzie

(57) ABSTRACT

A tapered spline 16 which allows members 12, 14 to be selectively coupled and which further allows energy to be selectively communicated by and between these members 12, 14.

12 Claims, 2 Drawing Sheets

SPLINE, AN ASSEMBLY UTILIZING THE SPLINE, AND A METHOD FOR TRANSFERRING ENERGY

FIELD OF THE INVENTION

The present invention generally relates to a spline, to an assembly utilizing the spline, and to a method for transferring energy, and more particularly, to a tapered spline which is adapted to selectively engage another spline, effective to allow energy to be transferred by and between first and second members while concomitantly reducing the likelihood of failure or fatigue.

BACKGROUND OF THE INVENTION

Oftentimes it is desirable to physically couple a pair of members, effective to allow energy, such as rotational energy, generated by or communicated to a first of the members to be communicated and transferred to a second of the members. This is typically achieved by the formation of several splines of a first type (e.g., male or "external" type splines) upon the first of the members and the formation of several splines of a second type (e.g., female or "internal" type splines) upon the second of the members.

That is, each of the splines of the first type engages and movably mates with a unique one of the splines of the second type, thereby causing the splines to form pairs of engaged and corresponding splines (e.g., each pair of corresponding splines includes a male and a female spline) and to cooperatively and physically couple the first ad second members, effective to allow energy to be transferred by and between these physically coupled members.

More particularly, each of these conventional splines usually has an engagement portion which is of a substantially identical shape having a relatively constant cross sectional area. The engagement portions of each pair of corresponding splines then selectively and movably mate, allowing the members to be physically coupled in the previously delineated manner. While these conventional -spline engagement portions do allow the members to be physically coupled, they do not allow each pair of cooperating and corresponding splines to remain fully engaged as the first member begins to receive a relatively large amount of load or torque and the members begin to structurally deform or deflect. Hence, the load or energy, which is communicated to the second member is substantially prevented from being evenly distributed along each of the pairs of the mated and corresponding splines (e.g., along each of the respective edges of each pair of mated engagement portions), thereby causing the load to be only applied to a certain portion of these spline engagement portions (e.g., at certain "points" or relatively small areas of an edge of each spline engagement portion), thereby increasing the likelihood of fatigue or failure.

SUMMARY OF THE INVENTION

It is a first non-limiting advantage of the invention to provide a spline which overcomes some or all of the previously delineated disadvantages of prior splines.

It is a second non-limiting advantage of the invention to provide a tapered spline.

It is a third non-limiting advantage of the invention to provide a spline having a pair of edges, a first of the edges being tapered and a second of the edges being substantially straight.

It is a fourth non-limiting advantage of the invention to provide an assembly having a pair of members, a first of the members having several substantially identical tapered splines and a second of the members having several substantially identical conventional splines.

According to a first aspect of the present invention, a tapered spline is provided.

According to a second aspect of the present invention, a pair of splines is provided, a first of the splines being tapered.

According to a third aspect of the present invention, an assembly is provided. The assembly includes a first selectively rotating shaft having a first spline; and a second shaft having a second spline which engages the first spline and which has a certain shape which allows the second spline to engage the first spline along the substantially entire length of the second spline.

According to a fourth aspect of the present invention, a method is provided for transferring energy from a first member to a second member, the first member being selectively rotated and the second member being deflected in response to the applied torque. The method includes the steps of forming at least a first spline upon the first member; and forming at least a second spline upon the second member, the at least second spline having a shape which allows the second spline to substantially engage the at least first spline along at least one edge of the first spline as the first member is being rotated and as the second member is being deflected.

These and other objects, features, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
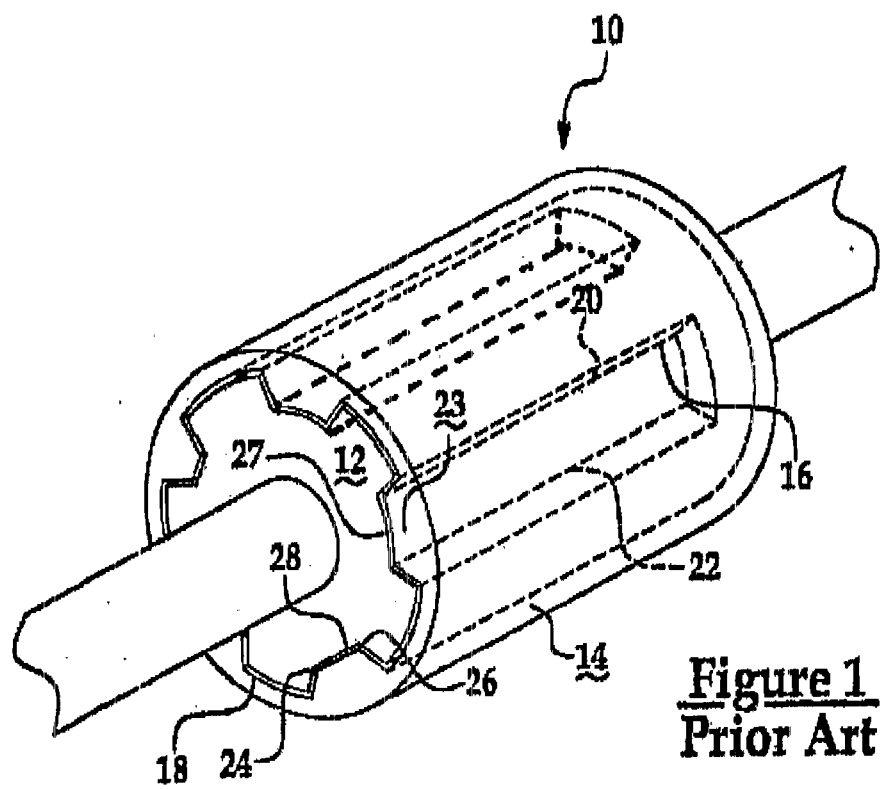
FIG. 1 is a perspective view of an assembly including a pair of coupled splined members which are made in accordance with the teachings of the prior art.
Figure 3:
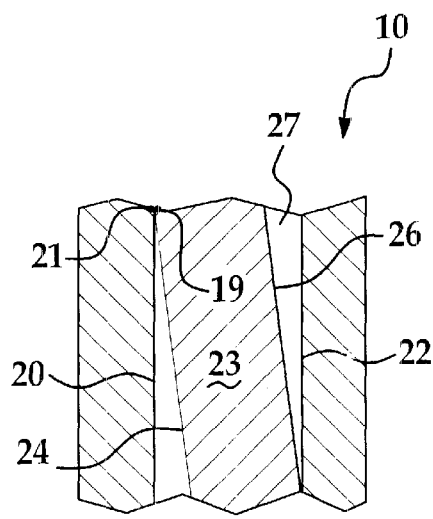
FIG. 3 is sectional view of the assembly which is shown in FIG. 1 under a torsional load.

Referring now to FIGS. 1 and 3, there is shown an assembly 10 which is made in accordance with the teachings of the prior art. As shown, assembly 10 includes a first and second splined member 12, 14. Particularly, members 12,14 each respectively include several splines 16, 18 which cooperatively allow members 12, 14 to be physically coupled and which cooperatively allow energy to be selectively communicated and transferred by and between these members 12, 14.

Particularly, splines 18 are of the female ("internal") type having substantially straight, longitudinally coextensive, and substantially parallel interior and opposed edges 20, 22 and forming a spline mating or engagement/reception portion 27 having a substantially constant cross sectional area (i.e., the cross sectional area of the reception portion 27 is substantially constant along its entire length and is bounded by edges 20, 22). Splines 16 are of the male ("external") type and similarly have substantially similar, substantially parallel, longitudinally coextensive and opposed edges 24, 26 and forming a protrusion 23 which is adapted to frictionally and movably reside within a unique one of the substantially identical reception portions 27. Protrusion 23 also has a substantially constant cross sectional area which is substantially identical to the cross sectional area of portion 27 and protrusion 23 is substantially and linearly coextensive to portion 23. In this manner, each of the female ("internal") type splines 18 of member 14 engages and/or operatively receives a unique one of the male ("external") type splines 16 of member 12, thereby allowing energy to be communicated by and between the coupled members 12 and 14 (e.g., the engaged splines 16, 18 allow rotational energy to be communicated by and between the members 12 and 14).

As the members 12, 14 begin to transmit and/or receive a relatively high torque, as shown best in FIG. 3, the driven member 14 (e.g., the term "driven" refers to the member 12, 14 receiving rotational energy from some source) begin to structurally deform or deflect. Since pairs of edges 20, 22; and 24, and 26 are substantially parallel, a deflection of member 12 (and/or of member 14) substantially prevents the pairs of edges 20 and 24; and 22 and 26 from remaining fully engaged, thereby preventing the stress or load, associated with and/or caused by the rotation of the members 12, 14, to be applied along substantially the entire length of the engagement portions 27 and 23 (i.e., the "load" is applied only to those respective portions of each spline pair 16, 18, such as portions 19 and 21, which remain physically engaged during the previously delineated deformation/deflection), as is best shown in FIG. 3.

Figure 2:
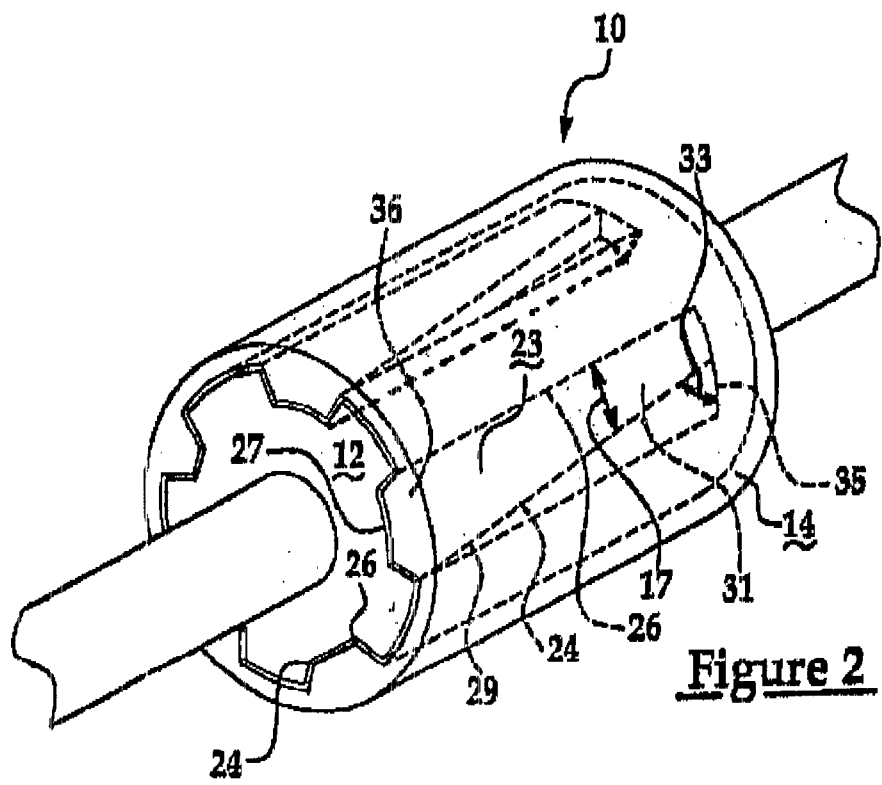
FIG. 2 is a perspective view ;of an assembly including a pair of coupled splined members which are made in accordance with the teachings of the preferred embodiment of the invention.
Figure 4:
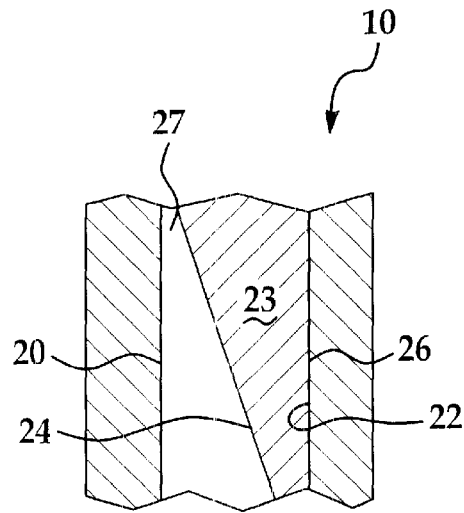
FIG. 4 is a sectional view of the assembly which is shown in FIG. 2 under a torsional load.

Referring now to FIGS. 2 and 4, to address this previously delineated drawback, the cross sectional area of each protrusion 23 is tapered (e.g., one or both of the edges 24,26 form an acute angle 33 with the substantially straight back edge 35 of the protrusion 23, thereby causing the distance 17 between edges 24, 26 to vary in an axial direction along protrusion 23) and causing the splines 16 to become "tapered splines". Such tapering, as is best shown in FIG. 4, is effective to allow at least one of the edges 24, 26 to respectively remain in substantially full and respective contact with one of the edges 20, 22 as the member 12 begins to deflect under maximum allowable load or torque. It should be appreciated that, in other non-limiting embodiments, the portions 27 of the female splines 14 may be tapered and the portions 23 of the male spline 16 may remain substantially similar to that geometric configuration which is shown in FIG. 1. As shown, the tapered splines 16 have a relatively narrow portion 31 and a relatively wide portion 29 remote from or distally positioned from the portion 31. Further, it should be realized that nothing in this application is meant to limit the use of these splines 16, 18 to a particular type of member 12, 14. Rather, these splines 16, 18 may be used on a wide variety of dissimilar members and assemblies. Moreover, in other non-limiting embodiments, both of the edges 24, 26 may form an acute angle with edge 35.

Figure 5:
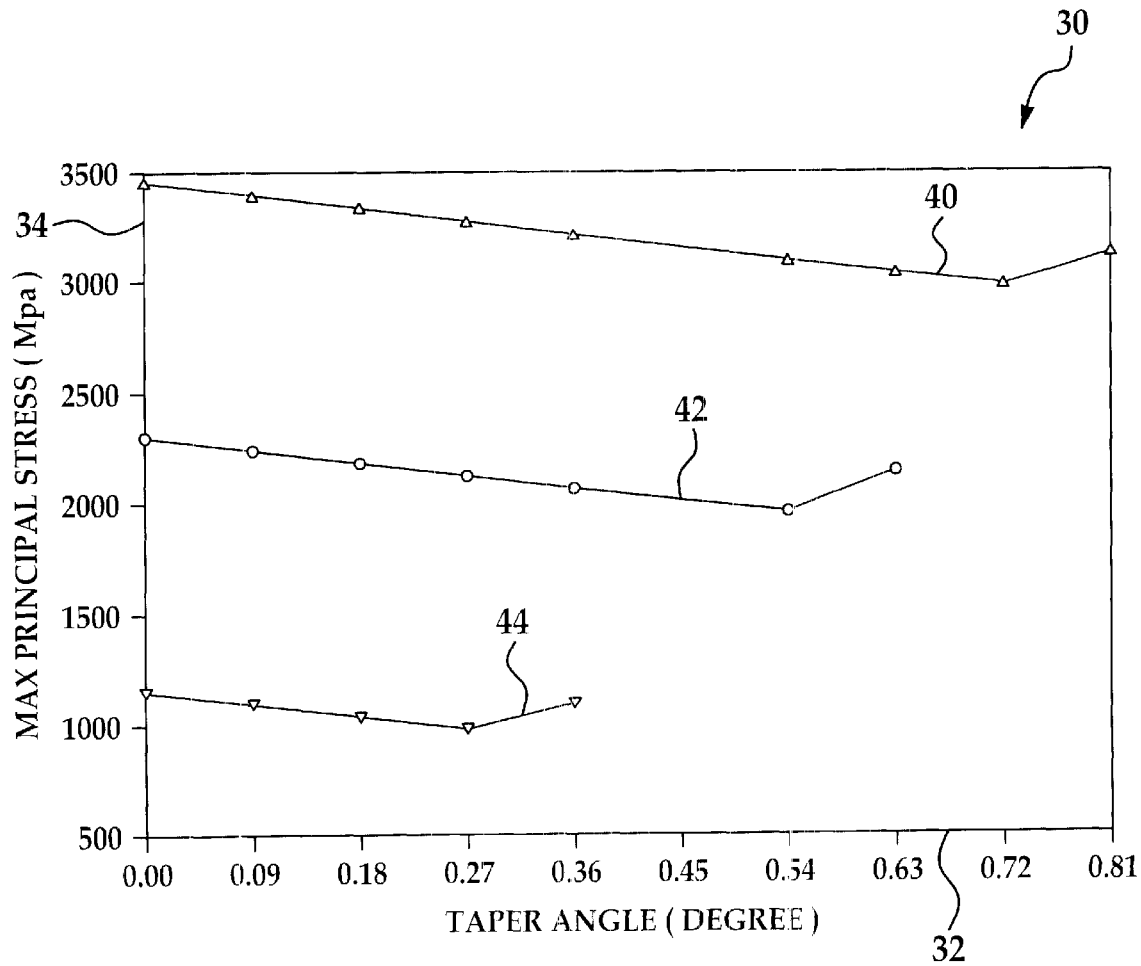
FIG. 5 is a series of graphs illustrating the relationship between the angle of taper and the amount of load or stress applied at the highest stressed portion of the tapered spline which is shown in FIG. 4.

The benefit of such tapered splines is shown, by way of example and without limitation, in graph 30 of FIG. 5. Particularly, the data associated with the graphical axis 32 represents various taper angle values (e.g., various values for the taper angle 33) while the data associated with the graphical axis 34 represents the maximum stress which occurs in or on the member 12 at point or area 36. Each line 40, 42, 44 represents a unique torque applied to the driven member 12. Particularly, graphical line 40 represents a input torque of 1100 lb-ft, graphical line 42 represents a input torque of 2200 lb-ft, and graphical line 46 represents a input torque of 3300 lb-ft. The data which is illustrated in graph 30 was obtained by the use of a conventional one inch diameter driveshaft as the member 12 and a one inch member made from conventional steel as the member 14. Particularly, graph lines 40, 42, 44 were created by the use of a finite element analysis. Hence, as shown by graph 30, the stress at point or area 36 is reduced as the amount of the taper angle 33 is increased. It should be further understood that the taper angle 33 may be selectively altered as the type or geometric configuration of members 12, 14 changes from those which have been delineated above and that in the embodiment shown in FIGS. 2 and 4, the angle of taper 33 is greater than about 0.1 degrees.

It is understood that the invention is not limited to the exact construction or method which has been previously delineated above, but that various changes may be made without departing from the spirit and the scope of the inventions as are more fully delineated in the following claims.

What is claimed is:

1. A method for transferring energy from a first member to a second member; said first member be selectively rotated and said second member deflecting in response to said rotation, of said first member, said method comprising the steps of:

forming at least a first spline upon said first member;

forming at least a second spline upon said second member, said at least a second spine having a shape which allows said second spline to substantially and fully engage at least one edge of said at least first spline as said first member is being rotated, wherein said at least a second spline is tapered along only one edge.

2. The method of claim 1 wherein said at least first spline has substantially parallel interior edges.

3. The method of claim 1 wherein said second spline has a first narrow portion.

4. The method of claim 3 wherein said second spline has a second wide portion distally positioned from said first narrow portion.

5. An assembly comprising a first selectively rotating shaft having at least one first spline; and a second shaft having at least one second spline which engages said at least one first spline, said second shaft deflecting in response to said rotation, wherein said at least on second spline is tapered along only one edge and which has a certain shape which allows said at least one second spline to engage said at least one first spline along substantially the entire length of said at least one second spline.

6. The assembly of claim 5 wherein said at least one second spline comprises a male spline.

7. The assembly of claim 5 wherein said at least one second spline comprises a female spline.

8. The assembly of claim 6 wherein said at least one second spline is tapered at an angle greater than about 0.1 degrees.

9. The assembly of claim 7 wherein said at least one second spline is tapered at an angle grater than about 0.1 degrees.

10. The assembly of claim 7 wherein said at least one tapered second spline is formed upon a second member which engages a first member a wherein said at least one tapered second spline has a first narrow portion and a second wide portion distally positioned from said first narrow portion.

11. The assembly of claim 6 wherein said at least one first spline has a substantially constant cross sectional area.

12. The assembly of claim 7 wherein said at least one second spline has a substantially constant cross sectional area.

* * * * *